(12) United States Patent
Sengodan (10) Patent No.: US 7,342,888 B2
(45) Date of Patent: *Mar. 11, 2008

(54) METHOD AND APPARATUS FOR PROVIDING RESOURCE DISCOVERY USING MULTICAST SCOPE

(75) Inventor: Senthil Sengodan, Woburn, MA (US)

(73) Assignee: Nokia Corporation, Espoo (FI)

( * ) Notice: Subject to any disclaimer, the term of this patent is extended or adjusted under 35 U.S.C. 154(b) by 996 days.

This patent is subject to a terminal disclaimer.

(21) Appl. No.: 10/014,217

(22) Filed: Oct. 22, 2001

(65) Prior Publication Data

US 2002/0054596 A1    May 9, 2002

Related U.S. Application Data

(63) Continuation of application No. 09/167,933, filed on Oct. 6, 1998, now Pat. No. 6,426,945.

(51) Int. Cl.
*H04L 12/26* (2006.01)
*H04J 3/16* (2006.01)

(52) U.S. Cl. .................. 370/236; 370/238; 370/465

(58) Field of Classification Search ............... None
See application file for complete search history.

(56) References Cited

U.S. PATENT DOCUMENTS

| | | | | | |
|---|---|---|---|---|---|
| 4,644,468 A | * | 2/1987 | Doster et al. | ................ | 709/220 |
| 4,924,493 A | * | 5/1990 | Dang et al. | ............... | 379/93.17 |
| 5,590,118 A | * | 12/1996 | Nederlof | ..................... | 370/218 |
| 5,909,431 A | * | 6/1999 | Kuthyar et al. | ............. | 370/260 |
| 5,926,101 A | * | 7/1999 | Dasgupta | ............... | 340/825.02 |

(Continued)

FOREIGN PATENT DOCUMENTS

EP    0 579 567 A2    1/1994

(Continued)

OTHER PUBLICATIONS

Sengodan, S., "*A Gatekeeper Discovery Mechanism for H.323 Systems*," SPIE Conference on Multimedia Systems and Applications, Nov. 1998, pp. 319-326.

(Continued)

*Primary Examiner*—Andrew C. Lee
(74) *Attorney, Agent, or Firm*—Squire, Sanders & Dempsey, L.L.P.

(57) ABSTRACT

A method and apparatus for providing resource discovery using multicast scope selection is disclosed. The method includes the discoverer sending a first request message having a first selected scope to a known multicast group, setting a timer after the first request message is sent, detecting whether a confirm message is received from an endpoint before the timer expires, terminating when a confirm message is received from an endpoint prior to the expiration of the timer, determining whether a scope increase is allowed when a confirm message is not received from an endpoint before the expiration of the timer, terminating when a scope increase is not allowed, increasing the scope to the second selected scope when a scope increase is allowed, resetting the timer and sending a second request message having the second selected scope when a confirm message is not received from an endpoint in response to the first request message, the second selected scope being greater than the first selected scope.

69 Claims, 8 Drawing Sheets

U.S. PATENT DOCUMENTS

| | | | | |
|---|---|---|---|---|
| 6,052,784 | A | * | 4/2000 | Day .......................... 713/201 |
| 6,104,695 | A | * | 8/2000 | Wesley et al. .............. 370/216 |
| 6,119,170 | A | * | 9/2000 | Schoffelman et al. ....... 709/244 |
| 6,130,881 | A | * | 10/2000 | Stiller et al. ................. 370/238 |
| 6,282,170 | B1 | * | 8/2001 | Bentall et al. .............. 370/225 |
| 6,665,278 | B2 | * | 12/2003 | Grayson ..................... 370/328 |

FOREIGN PATENT DOCUMENTS

| WO | WO 96 13108 | 5/1996 |
|---|---|---|

OTHER PUBLICATIONS

"*Control Protocol for Multimedia Communication,*" International Telecommunications Union, ITU-T, H.245, 188 pages, Mar. 1996.

"*Media Stream Packetization and Synchronization on Non-Guaranteed Quality of Service LANs,*" International Telecommunications Union, ITU-T, H.225.0, 113 pages, Nov. 1996.

"*Visual Telephone Systems and Equipment for Local Area Networks Which Provide a Non-Guaranteed Quality of Service,*" International Telecommunication Union, ITU-T, H.323, 79 pages, Nov. 1996.

* cited by examiner

METHOD AND APPARATUS FOR PROVIDING RESOURCE DISCOVERY USING MULTICAST SCOPE

This application is a continuation of application Ser. No. 09/167,933, filed Oct. 6, 1998, now U.S. Pat. No. 6,426,945 which is incorporated herein in its entirety.

BACKGROUND OF THE INVENTION

1. Field of the Invention

This invention relates in general to a multimedia communications, and more particularly to a method and apparatus for providing resource discovery using multicast scope selection.

2. Description of Related Art

Of the communication tools found in most offices today, such as E-mail, fax machines, pagers, and cellular phones, videoconferencing has yet to make the short list. However, this is changing, as companies move to take advantage of lower system costs and emerging new standards. For example, videoconferencing over an enterprise IP network is very appealing. It makes better use of an organization's funds rather than sinking additional investments in ISDN lines. Up to now, ISDN has been the only reliable way to connect video-enabled workstations and conference-room-based systems. However, the technology isn't readily available, and it's still expensive. Nevertheless, H.323-standard LAN-operable DVC (desktop videoconferencing) solutions are available.

The H.323 standards architecture specifies gateways and gatekeepers that enable connections among LAN-based DVC units, ISDN-connected H.320 units, analog telephone-connected H.324 devices, and ISDN and POTS telephones. One rapidly emerging branch of this market includes gateway and billing server systems devoted to Internet telephony.

The H.323 standard provides a foundation for audio, video, and data communications across IP-based networks, including the Internet. By complying to H.323, multimedia products and applications from multiple vendors can interoperate, thereby allowing users to communicate without concern for compatibility. H.323 will be the keystone for LAN-based products for consumer, business, entertainment, and professional applications.

More specifically, H.323 is an umbrella recommendation from the International Telecommunications Union (ITU) that sets standards for multimedia communications over packet switched networks. This includes Local Area Networks (LANs) that do not provide a guaranteed Quality of Service (QoS), which dominate today's corporate desktops and include packet-switched TCP/IP and IPX over Ethernet, Fast Ethernet and Token Ring network technologies. Therefore, the H.323 standards are important building blocks for a broad new range of collaborative, LAN-based applications for multimedia communications.

The H.323 specification was approved in 1996 by the ITU's Study Group 16. Version 2 was approved in January 1998. The standard is broad in scope and includes both stand-alone devices and embedded personal computer technology as well as point-to-point and multipoint conferences. H.323 also addresses call control, multimedia management, and bandwidth management as well as interfaces between LANs and other networks.

H.323 is the latest of the recommendations on the H.32X series which specifies standards for videoconferencing over a variety of networks. H.323 includes much of the work done since the approval of the H.320 recommendation in 1990, which is a specification for multimedia over circuit switched digital telephone networks. The H.32X is composed of the following recommendations:

H.320 allows videoconferencing over narrowband switched ISDN.
H.321 is for videoconferencing over broadband ISDN ATM LAN.
H.322 allows videoconferencing over Guaranteed bandwidth packet switched networks.
H.323 allows videoconferencing over non-guaranteed bandwidth packet switched networks.
H.324 is for videoconferencing over PSTN or POTS (the analog phone system).

The H.323 Protocol Stack supports many real time applications that the industry is eager to use through the Internet such as: Desktop Videoconferencing, Internet Telephony and Videotelephony, Collaborative Computing, Business Conference Calling, Distance Learning, Support and Help Desk Applications, etc. These applications already exist in the market, but most of them do not address the problem of how to run these applications over a packet switched network like the Internet and most corporate LANs which are based on the TCP/IP suite of protocols. With the pressure of the market to use these kinds of applications over the Internet, H.323 emerges as a possible solution to the business needs.

Figure 1:
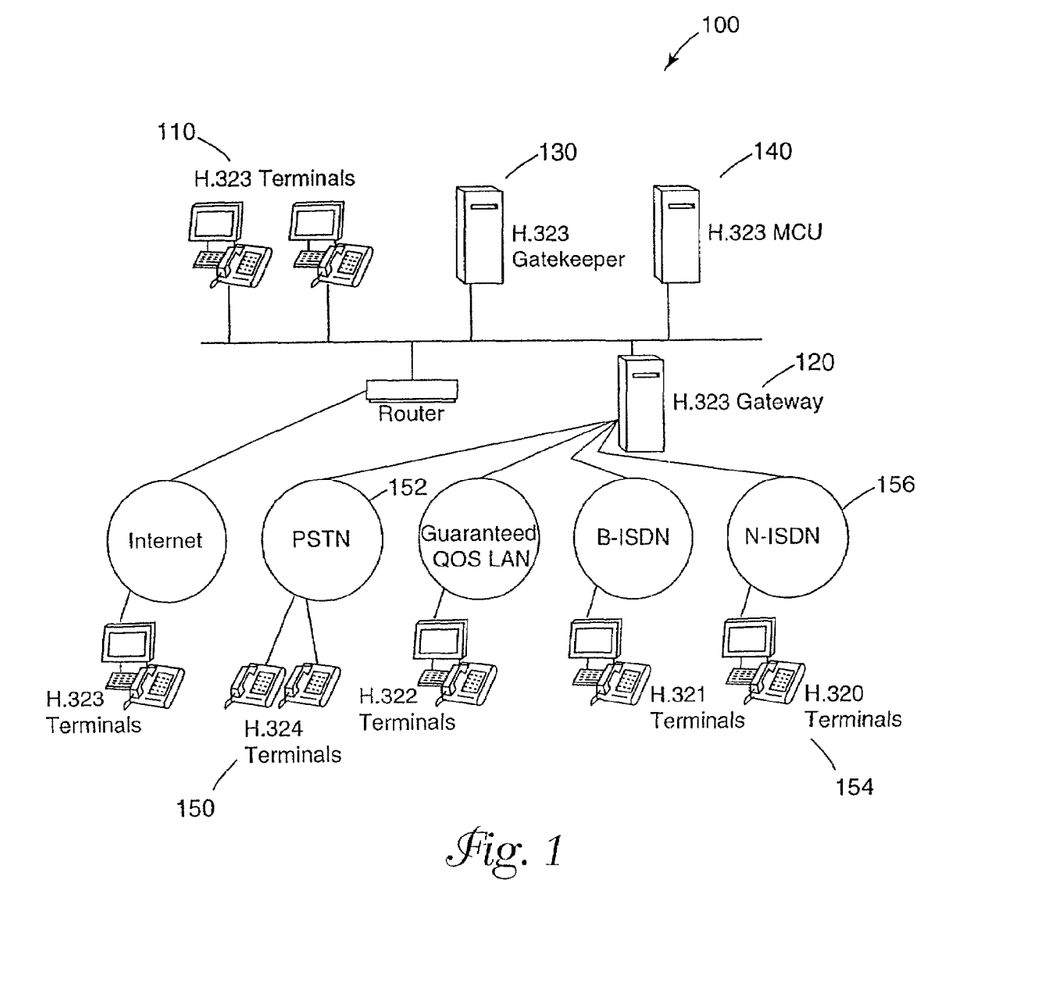
FIG. 1 illustrates a H.323 system.

H.323 defines four major components for a network-based communications system. FIG. 1 illustrates a H.323 system 100. In FIG. 1, the four major components of a H.323 system 100 are shown including their interaction with existing networks. These components interact with LANs that may not provide QoS. The four components include Terminals 110, Gateways 120, Gatekeepers 130 and Multipoint Control Units (MCUs) 140.

These four elements 110-140 are specified only for the Application Layer of the Internet Layer Model. There is no specification about the lower layers (Transport, Network, Data link and physical layers). This characteristic makes H.323 flexible and allows H.323 devices to communicate with devices of other networks.

H.323 Terminals 110 are the client software that runs in the end user computers that allow users to communicate in real time using all the power of multimedia. These terminals are also called Endpoints.

A Gateway 120 is a component of the H.323 specification that provides world wide connectivity and interoperability from LAN. That is, a Gateway 120 will allow computers connected to a LAN to communicate to regular phones 150 connected to the PSTN 152, to digital phones 154 (H.320 terminals) connected to an ISDN network 156. A gateway 120 also translates between different types of codecs used by different kinds of terminals, maps call signaling between Q.931 to H.225 and maps control signaling between H.242/H.243 to H.245.

In general, a Gateway 120 is a component that makes possible to interconnect a packet switched network to other types of networks. If connections to different types of networks are not required, then a Gateway 120 is not required since terminals can communicate between them if they are on the same LAN. Terminals communicate with gateways using H.225.0 and H.245 protocols.

A Gatekeeper 130 is an H.323 component that performs four basic functions:

Address Translation: It is the mechanism that allows to have different kinds addressing systems. For example, regular phone numbers (E.164 addresses) can be used in conjunction with email addresses. The Gatekeeper 130 allows to communicate with terminals addressed in different ways.

Admission Control: The Gatekeeper 130 could reject calls from users. An user must be registered with the Gatekeeper 130 in order to complete a call.

Bandwidth Control: Networks managers can restrict the amount of bandwidth used for videoconference, which provide a way to control LAN traffic. The remaining of the bandwidth can be used then for web requests, email, file transfers, etc.

Zone Management: The Gatekeepers 130 provide the functions of Address Translation, Admission Control and Bandwidth control for Terminals 110, MCUs 140 and Gateways 120 registered with the Gatekeeper 130 in its zone of control. This zone is called H.323 zone.

The functions of the Gatekeeper 130 are included in the Gateway 120 by most vendors, although they are logically separate and they perform different kinds of functions.

The Multipoint Control Unit (MCU) 140 is a logical device that supports conferences between two or more endpoints. The MCU 140 typically is integrated with the implementation of the gateway, so in most implementations the MCU 140 won't be a separate computer performing conferencing functions. Also, with a combined implementation of the functions of the MCU 140 with the functions of the gateway 120, conferences among participants of different networks (LAN and PSTN) will have better performance than divided implementations.

In operation, several applications need to discover resources of different kinds depending on different criteria. For instance, in the H.323 standard, a Terminal 110 may need to discover a suitable Gatekeeper 130 so that it may register with it. Such resource discovery needs to occur in a dynamic fashion to account for possible topology changes and failures within the network. Moreover, the mechanism needs to be simple and efficient.

It can be seen then that there is a need for an efficient way of implementing the method of multicasting to a well-known group of resources when dynamic resource discovery is warranted.

It can also be seen that there is a need for a method and apparatus for providing resource discovery using multicast scope selection.

SUMMARY OF THE INVENTION

To overcome the limitations in the prior art described above, and to overcome other limitations that will become apparent upon reading and understanding the present specification, the present invention discloses a method and apparatus for providing resource discovery using multicast scope selection.

The present invention solves the above-described problems by providing a scope that may be varied in a dynamic fashion so that resources that do not need to be reached are not.

A method in accordance with the principles of the present invention includes sending a first request message having a first selected scope, analyzing whether a confirm message is received in response to the first request message and sending a second request message having a second selected scope when a confirm message is not received in response to the first request message, the second selected scope being greater than the first selected scope.

Other embodiments of a system in accordance with the principles of the invention may include alternative or optional additional aspects. One such aspect of the present invention is that the analyzing further includes setting a timer after the first request message is sent, detecting whether a confirm message is received before the timer expires and terminating the resource discovery procedure when a confirm message is received prior to the expiration of the timer.

Another aspect of the present invention is that the detecting further includes determining whether a scope increase is allowed when a confirm message is not received before the expiration of the timer, terminating the resource discovery procedure when a scope increase is not allowed, increasing the scope to the second selected scope when a scope increase is allowed and resetting the timer.

Another aspect of the present invention is that the sending further includes transmitting the request message to a known multicast group.

Another aspect of the present invention is that the scope comprises a Hop Count, the Hop Count represent a number of nodes in a multicast tree that the request message propagates.

Another aspect of the present invention is that the Hop Count is decremented at a node in the multicast tree receiving the request message and the request message is forwarded to a next node in the multicast tree.

Another aspect of the present invention is that the request message further comprises a Threshold Hop Count for limiting the propagation of the request message in the multicast tree.

Another aspect of the present invention is that the method further includes comparing the Threshold Hop Count to the scope, preventing a response to the request message when the scope is greater than the Threshold Hop Count and responding to the request message when the scope is not greater than the Threshold Hop Count.

Another aspect of the present invention is that the request message further comprises parameters for analyzes by a node receiving the request message.

Another aspect of the present invention is that the parameters further comprises hop-by-hop parameters, the hop-by-hop parameters being modified by intermediate nodes during the propagation of the request message in the multicast tree.

Another aspect of the present invention is that the parameters further comprise destination parameters, the destination parameters being used by an resource being discovered using the request message to determine whether the resource responds using a confirm or a reject message.

Another aspect of the present invention is that a discoverer is provided including a discovery unit and an application, operatively coupled to the discovery unit, the application sending a notification to the discovery unit for locating an endpoint application, wherein the discovery unit sends a first request message having a first selected scope to a multicast group, analyzes whether a confirm message is received in response to the first request message; and sends a second request message having a second selected scope when a confirm message is not received in response to the first request message, the second selected scope being greater than the first selected scope.

Another aspect of the present invention is that a timer is provided for setting a window for receiving the confirm message, wherein the discovery unit sets the timer after the first request message is sent, detects whether a confirm message is received before the timer expires and terminates the location of an endpoint when a confirm message is received prior to the expiration of the timer.

Another aspect of the present invention is that the discovery unit determines whether a scope increase is allowed when a confirm message is not received before the expiration of the timer, terminates the location of an endpoint when a scope increase is not allowed, increases the scope to the second selected scope when a scope increase is allowed and resets the timer.

Another aspect of the present invention is that the application and the discovery unit are co-located.

Another aspect of the present invention is that the application and the discovery unit are not co-located.

Another aspect of the present invention is that discovery unit includes a base transceiver station, a base station controller or a mobile services switching center.

Another aspect of the present invention is that the application comprises a mobile terminal.

Another aspect of the present invention is that a discovereree is provided at the receiving end, the discoveree, upon receiving a request message, decrementing the Hop Count, modifying the hop-by-hop parameters, examining whether the Hop Count is zero, passing the request message down the multicast tree when the Hop Count is zero, examining the destination parameters, and suitably sending a confirm or rejection message to the discoverer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing resource discovery using multicast scope selection. The present invention provides a scope that may be varied in a dynamic fashion so that resources that do not need to be reached are not. A feedback mechanism is provided wherein the resources can feedback information such as hop count, bandwidth, etc., back to the Discoverer. Such a feedback mechanism may be employed by the Discoverer in determining whether the scope may be increased for subsequent request messages.

Figure 2:
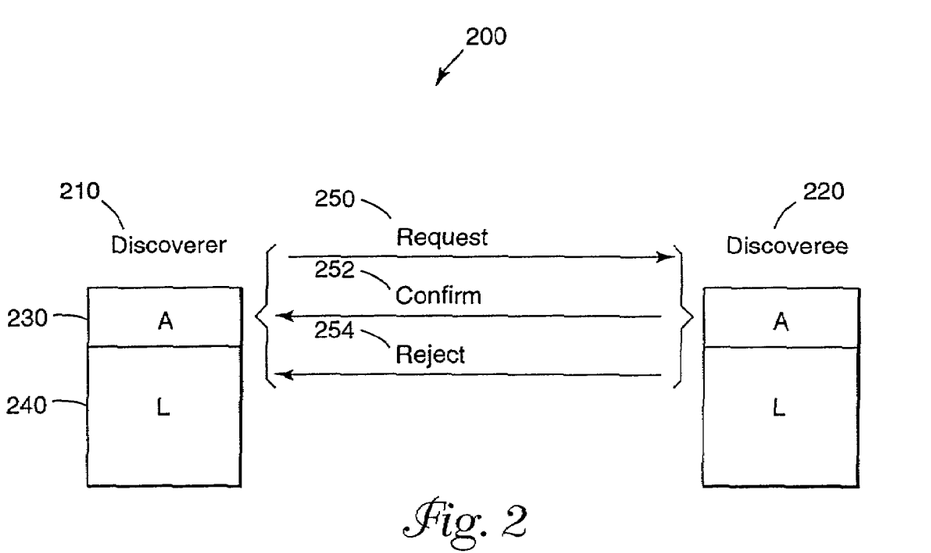
FIG. 2 illustrates a Discoverer and a Discoveree from an OSI layer standpoint.

FIG. 2 illustrates a Discoverer 210 and a Discoveree 220 from an OSI layer standpoint 200. As shown, the protocol according to the present invention is used at the application layer 230 rather than at the lower layers 240. A Discoverer 210 is the entity that wishes to discover a certain resource, while the Discoveree 220 is the resource that is being discovered. A Request 250 is the message that is sent by the Discoverer 210 to the well-known multicast group. A Confirm 252 is the message that a Discoveree 220 unicasts to the Discoverer 210 upon receiving a Request message 250 indicating that the Discoverer 210 could use this resource. Finally, Reject 254 is the message that a Discoveree 220 unicasts to the Discoverer 210 upon receiving a Request message 250 indicating that the Discoverer 210 can not use this resource.

Figure 3:
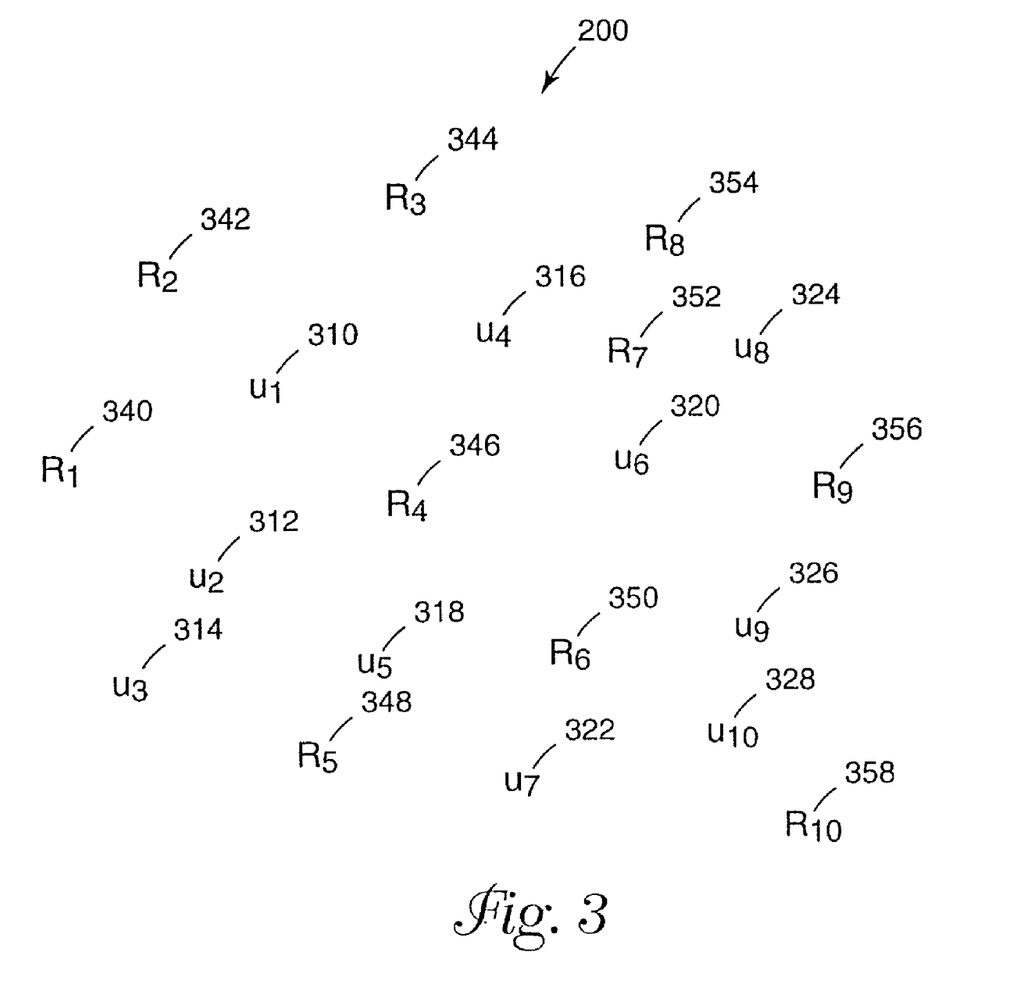
FIG. 3 illustrates a generic distribution of Discoverers and Discoverees.

FIG. 3 illustrates a generic distribution 300 of Discoverers and Discoverees. Discoverers are depicted by u 310-328 (for users) while Discoverees are depicted by R 340-358 (for resources). It is possible that an entity which is a Discoverer in one case is a Discoveree in another. The proximity of a Discoveree from a Discoverer is defined as the number of hops that a message takes to go from the Discoverer to the Discoveree. All the Discoverees join a well-known multicast group.

Figure 4:
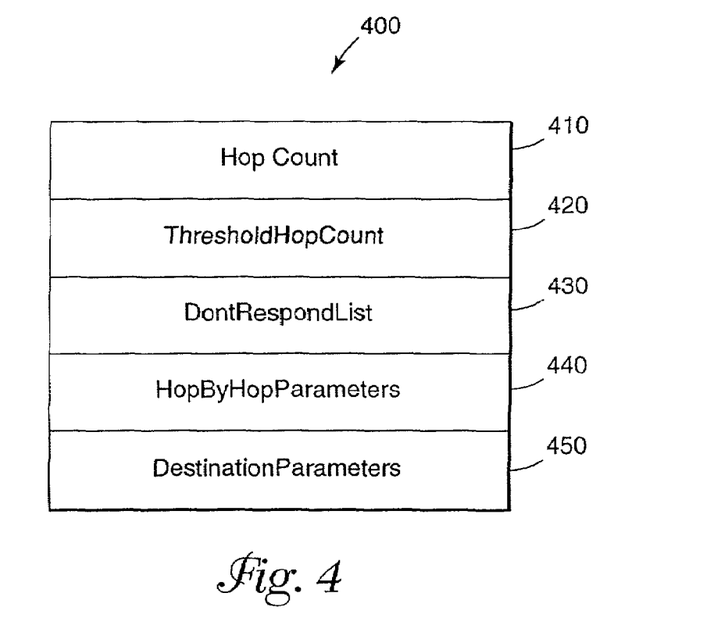
FIG. 4 indicates the fields that are included in the request message.

FIG. 4 indicates the fields 400 that are included in the request message. These are the Hop Count 410, ThresholdHopCount 420, DontRespondList 430, HopByHopParameters 440 and DestinationParameters 450. The Hop Count 410 is used to determine whether the message propagates any further or not. Every node of the multicast tree that receives the request message decrements the Hop Count by one, and if the resulting value is not zero, it forwards it down the multicast tree.

The ThresholdHopCount 420 is used by the Discoveree to determine whether to respond to a request or not. If the Hop Count 410 is greater than this value, a Discoveree does not respond to the request message. Else, it responds either with a confirm or a reject. When a Discoverer retransmits a Request message with a larger scope (scope 2), all the discoverees that previously responded (when scope 1 was used) should not respond. ThesholdHopCount is one way of achieving that. The DontRespondList 430 is a explicit list of Discoverees that do not need to respond. If a Discoveree finds itself listed on this list, it does not respond to the request message. Else, it responds either with a confirm or a reject.

The HopbyHopParameters 440 are parameters which are inspected and possibly modified by intermediate entities in the multicast tree. For instance, one such parameter could be bandwidth reserved, which could be modified by the intermediate nodes depending on the amount reserved in the incoming link. The DestinationParameters 450 are parameters used by the Discoveree to help determine whether to respond using a confirm or a reject message. They are not inspected or modified by the intermediate nodes.

Figure 5:
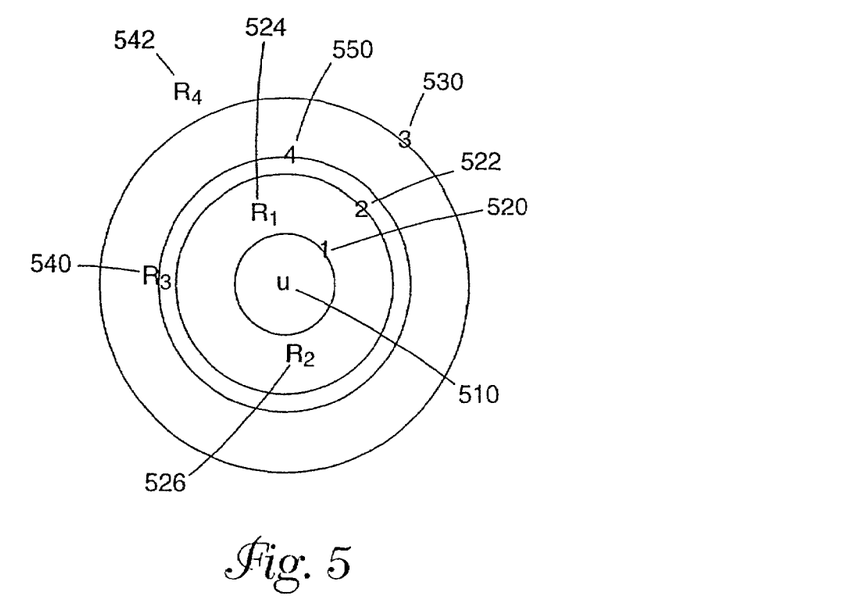
FIG. 5 illustrates scope variations as applied to distributed resources.

At the beginning of the discovery process, the Discoverer sets the scope in the request message to the best estimate of the proximity of the desired Discoverees. FIG. 5 illustrates scope variations 500 as applied to distributed resources. The user 510 is shown in FIG. 5 in the center. Here, the user wishes to discover resource $R_3$. The first scope 520 does not encompass any resources, i.e., there are no resources within the first scope 520. The second scope 522 encompasses $R_1$ 524 and $R_2$ 526. The third scope 530 encompasses $R_1$ 524, $R_2$ 526 and $R_3$ 540, but not $R_4$ 542. The fourth scope 550, while greater than the second scope 522, but less than the third scope 530, is just sufficient to encompass $R_3$ 540.

Figure 6:
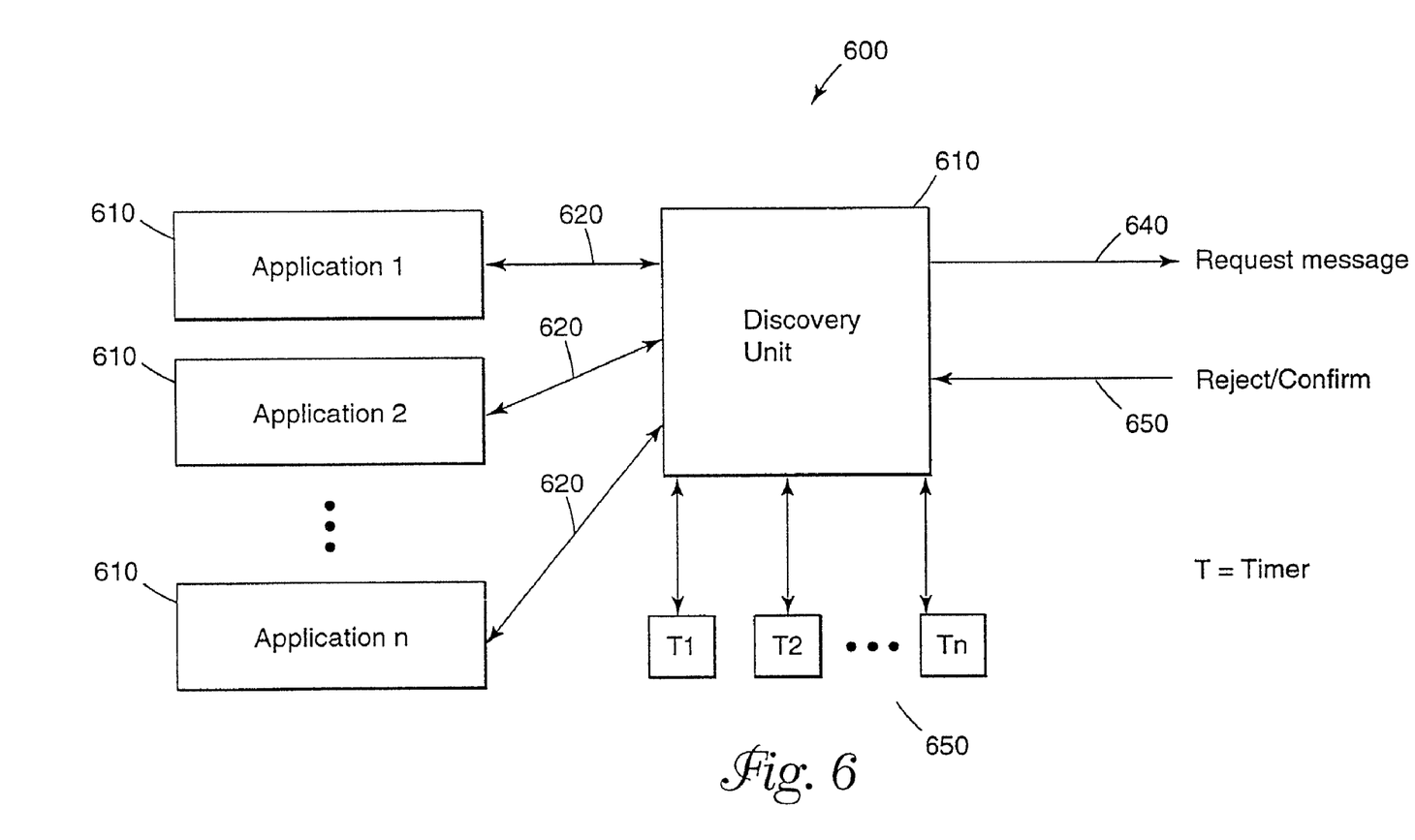
FIG. 6 illustrates the system architecture of a Discoverer according to the present invention.

FIG. 6 illustrates the system architecture 600 of a Discoverer according to the present invention. The discovery unit 610 may either be co-located with the applications 620 or may reside separately from the application 610. An example of the former case is when a PSTN-H.323 gateway implements both the H.323 stack as well as the discovery unit. An example of the latter case is when a H.323 Single Use Device (SUD) implements the light-weight H.323 profile, while the discovery unit could be located at a separate unit, e.g., at a Base Transceiver Station (BTS), Base Station Controller (BSC) or Mobile Services Switching Center (MSC) for a mobile H.323 SUD.

Figure 8:
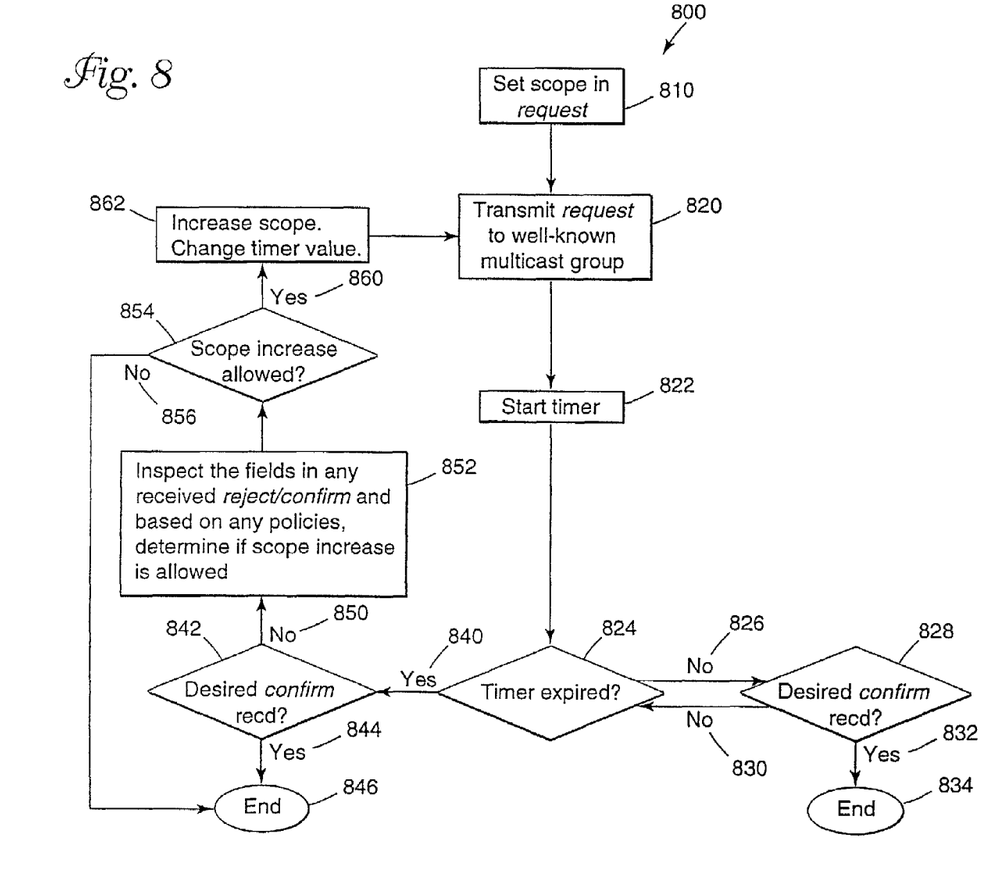
FIG. 8 illustrates a flow chart of the Discoverer functionality according to the present invention.

The discovery unit 610 receives a notification 620 from an application 610 to begin the discovery process. The discovery unit 610 sets the appropriate timer 630 and transmits a Discover message 640. The remaining sequence of events that occur at the Discoverer, including receipt of a Reject or Confirm Message 650 are as shown in FIG. 8 herein below.

Figure 7:
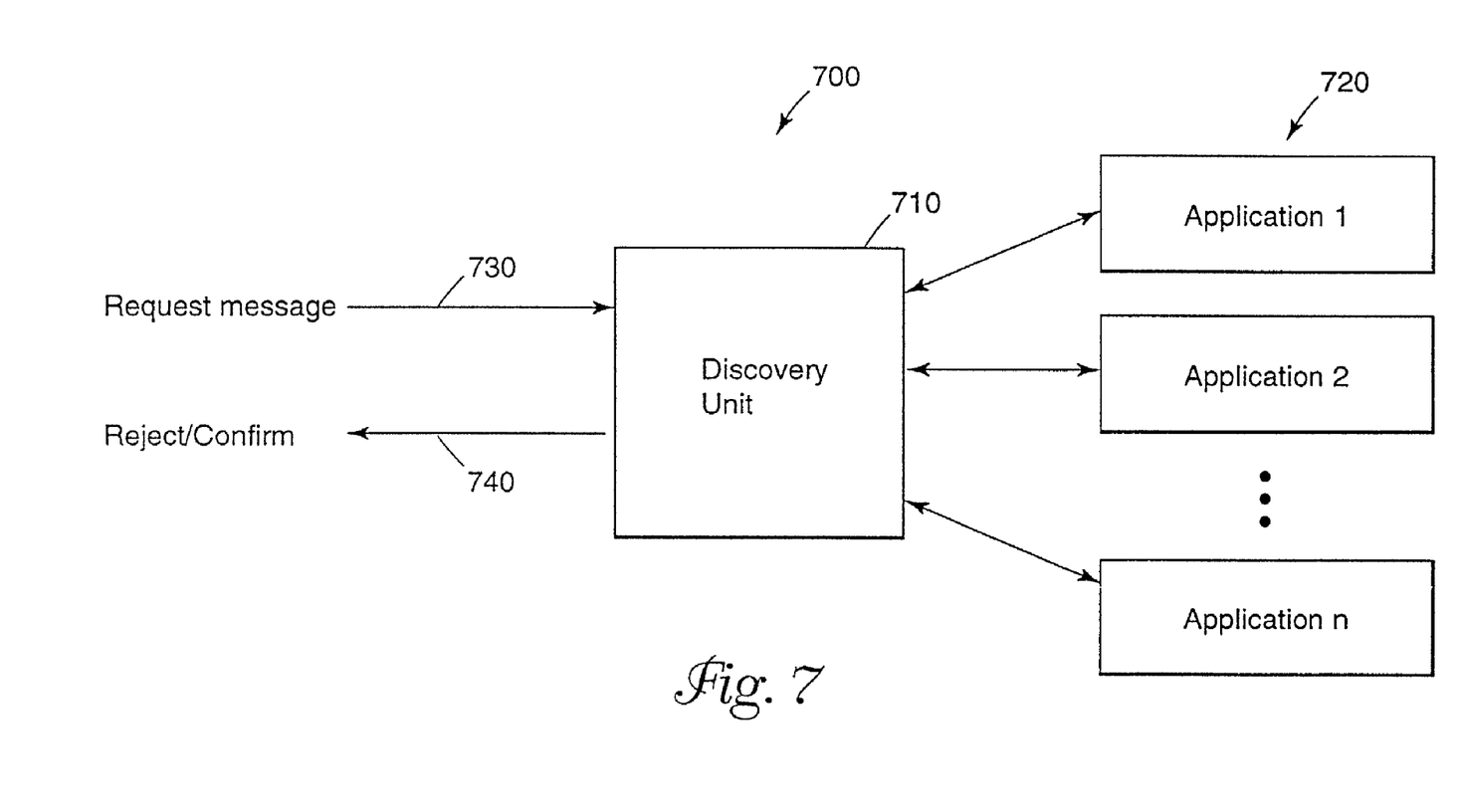
FIG. 7 illustrates the system architecture 700 of the Discoveree according to the present invention.

FIG. 7 illustrates the system architecture 700 of the Discoveree according to the present invention. As in the case of the Discoverer, the discovery unit 710 of a Discoveree 700 may either be co-located with the application 720 or it may be separate. Upon receiving the Discover message 730, the discovery unit 710 contacts the suitable application 720 to determine whether to confirm or reject message 740 needs to be sent to the Discoverer. The Discoveree also modifies the Hop Count and hop-by-hop parameters field, and if the Hop Count is greater than zero, passes the Request message down the multicast tree.

Referring to both FIGS. 6 and 7, after the Discoverer 610 sets the scope in the request message 640, the Discoverer 610 then multicasts the request message to the well-known multicast group, after which it starts a retransmission timer 630. Intermediate nodes, in addition to decrementing the HopCount, inspect and could modify the HopByHopParameters field of the request message. If the HopCount is zero, the packet is not forwarded; else it is forwarded to the next node in a multicast tree.

If a Discoveree 710 is within the scope of the multicast message, the Discoveree receives the request message 730. The Discoveree 710 then checks the values of the various fields in the request message 730. If the HopCount is greater than the ThresholdHopCount or if the Discoveree 710 is listed in the DontRespondList, then the Discoveree 710 discards the request message. Else, the Discoveree 710 determines whether to respond using a confirm or a reject message 740 based on the value of other parameters in the request message. The confirm/reject message would include the Hop Count that was present in the request message at the time it was received by the Discoveree 710. In addition, the Discoveree 710 inspects and potentially modifies the HopbyHopParameters field before including it in the confirm/reject message.

If a Discoveree 710 is outside the scope of the multicast message, then it does not receive the request message. If a sufficient number of confirm messages 650 (or a confirm message from a desired resource) are not received by the Discoverer 610 prior to the expiration of the retransmission timer 630, then the Discoverer 610 may generate a new request message 640 with updated fields.

FIG. 8 illustrates a flow chart 800 of the Discoverer functionality according to the present invention. The logistics that would occur at the Discoverer are then indicated in FIG. 8. First the scope is set in the request 810. A request is then transmitted to a well-know multicast group 820. Thereafter, a timer is initiated 822. Next, the Discoverer waits for response and a determination is made to whether the timer has expired 824. If not 826, a determination is made as to whether the desired Confirm was received 828. If not 830, the Discoverer continues to wait 824. If the desired Confirm is received 832, the process ends 834.

If the timer expires 840, a determination is made as to whether the desired Confirm was received 842. If yes 844, the process terminates 846. If not 850, the Discoverer inspects the fields in any receive reject/confirm message and based on any policies, determine if a scope increase is allowed 852. According to the determination, the Discoverer decides whether the scope may be increased 854. If not 856, the process terminates 846. If an increase may be allowed to the scope 860, the scope is increased and the timer value is changed 862. Then, a Request is again transmitted 820 and the process continues.

Accordingly, if a new request message is to be issued, then the Discoverer increase the scope in the request message suitably. For instance, the scope increase could be based on some function (additive or multiplicative increase) or based on a look-up table.

Returning to FIG. 5, resource $R_3$ 540 is attempting to be discovered. The first two multicast request messages 520, 522 are of insufficient scope, while the third request message 530 has a larger than necessary scope. Based on the returned Hop Count in the confirm/reject message to the third request message 530, any future request messages could have an efficient scope as indicated in the fourth request message 550.

The Discoverer 510 may include the resources that responded previously in the DontRespondList and/or include a ThresholdHopCount whose value equals the value of the HopCount in the previously sent request message.

A Discoverer 510 may need to rediscover resources at a later time due to topological changes or failures. When the Discoverer 510 transmits a new request message, it sets the scope to a new best estimate of the proximity. This value, could for instance, equal the proximity of the previously discovered Discoveree 540.

The ITU-T H.323 umbrella of standards for multimedia conferencing over packet switched networks describes the roles of terminals and gatekeepers. Terminals have to discover gatekeepers and register with one gatekeeper. In addition, to facilitate inter-gatekeeper communication, gatekeepers have to discover other gatekeepers and register with one or more of them. The proposed method could be used in this case for discovering the gatekeepers.

Accordingly, the scope can be varied in a dynamic fashion, as against use of a static value for the scope. In the case where the scope is set statically, the value of the set scope usually has to be sufficiently large so that all desired resources that need to be discovered are reached by the request message. However, according to the present invention, the scope is chosen so that resources that don't need to be reached are not. Hence, the present invention results in an efficient use of network bandwidth. Efficient use of network bandwidth is also achieved by the fact that resources that are not required to respond, for example, because, they have previously responded, are either explicitly listed in the request message or find that the received Hop Count is greater than the ThresholdHopCount, and hence, do not respond.

Figure 9:
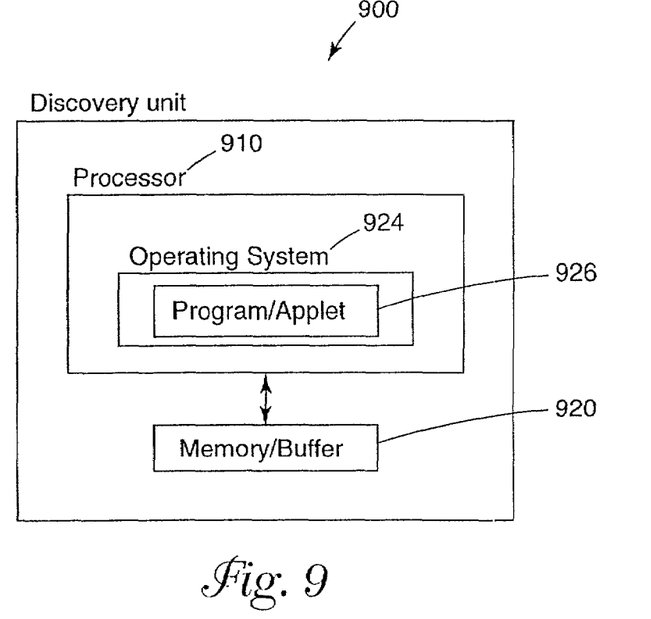
FIG. 9 illustrates a block diagram of a discoverer unit implementing a resource discovery procedure according to the present invention.

FIG. 9 illustrates a block diagram of a discoverer unit 900 implementing a resource discovery procedure according to the present invention. The present invention is typically implemented using a processor 910 and at least one type of memory or buffer 920 such as random access memory (RAM) or read-only memory (ROM). It is envisioned that an interface device (not shown) may coupled to the discoverer unit 900.

The processor 910 operates under the control of an operating system 924. The processor 910 executes one or more computer programs/applet 926 under the control of the operating system 924. The present invention comprises a method for providing resource discovery using multicast scope selection that is preferably implemented in the operating system 924 and/or computer programs/applets 926.

Figure 10:
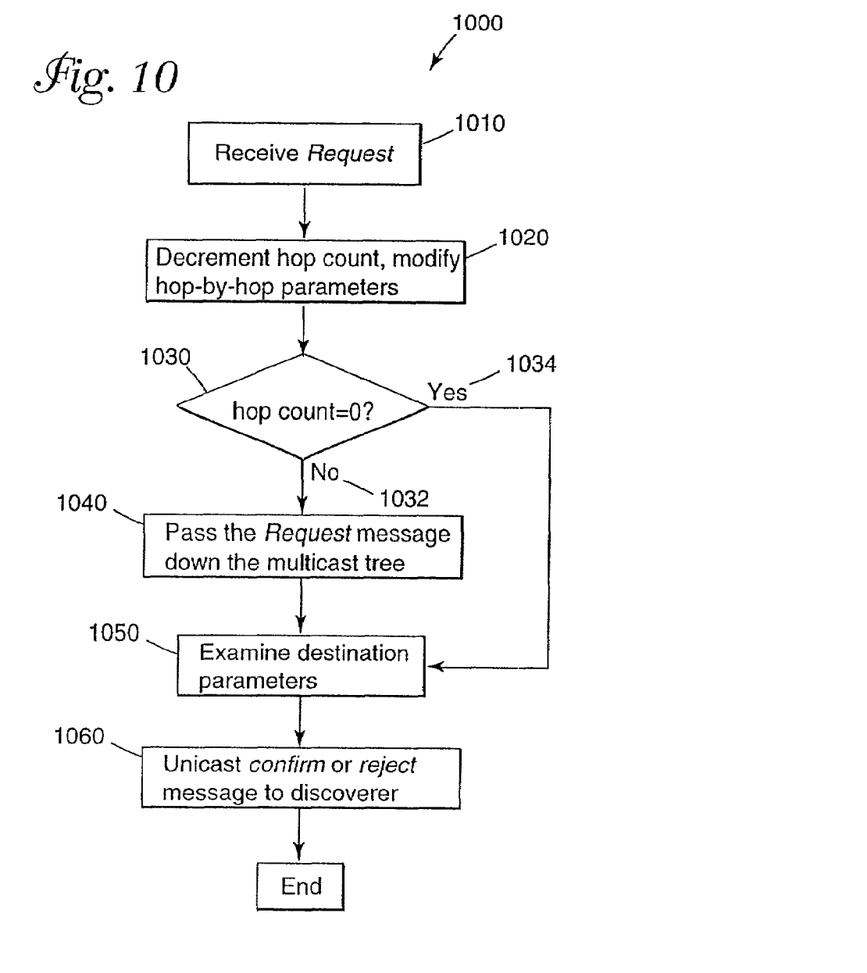
FIG. 10 illustrates a flow chart of the Discoveree functionality according to the present invention.

FIG. 10 illustrates a flow chart 1000 of the Discoveree functionality according to the present invention. First a Request message is received 1010. The Hop Count is then decremented and the hop-by-hop parameters are modified 1020. Next, a determination is made as to whether the hop count is equal to zero 1030. If not 1032, the Request message is duplicated and passed down the multicast tree 1040 and then the destination parameters are examined 1050. If yes 1034, the Discoveree merely examines the destination parameters 1040. Thereafter, a unicast confirm or reject message is sent to the discoverer 1050.

Figure 11:
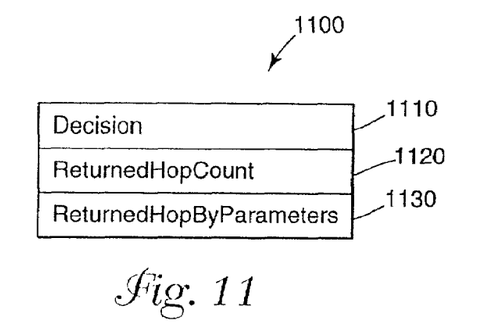
FIG. 11 illustrates the fields in the Response message according to the present invention.

FIG. 11 illustrates the fields in the Response message 1100 according to the present invention. The fields in the Response message 1100 include a decision filed 1110 for indicating whether the response is a confirm or a reject message. A ReturnedHopCount field 1120 has the value of the Hop Count field at the time it was received by the Discoveree in the Request message. The ReturnedHopByHopParameters field 1130 has the value of the HopByHopParameters received by the Discoveree in the Request message and after any suitable modification by the Discoveree.

In summary, the present invention provides a method for resource discovery in computer networks. Several methods are available for resource discovery, e.g., use of the service location protocol (SLP), use of the SRV record in the DNS etc. The present invention thus provides an efficient way of performing resource discovery using an existing mechanism of multicast scope.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, comprising:
  sending a first request message having a first selected scope;
  analyzing whether a confirm message is received from a discovered resource within the first selected scope in response to the first request message; and
  sending a second request message having a second selected scope when a confirm message is not received from a discovered resource in response to the first request message, the second selected scope being greater than the first selected scope,
  wherein the method is configured to provide resource discovery.

2. The method of claim 1, wherein the analyzing further comprises
  setting a timer in response to the first request message being sent,
  detecting whether a confirm message is received before the timer expires, and
  terminating the resource discovery procedure when a confirm message is received prior to the expiration of the timer.

3. The method of claim 2, wherein the detecting further comprises
  determining whether a scope increase is allowed when a confirm message is not received before the expiration of the timer,
  terminating the resource discovery procedure when a scope increase is not allowed,
  increasing the scope to the second selected scope when a scope increase is allowed, and resetting the timer.

4. The method of claim 3, wherein the determining further comprises inspecting fields of a response message and determining whether a scope increase is allowed based upon the response message and policies included therein.

5. The method of claim 1, wherein the sending further comprises transmitting the request message to a known multicast group.

6. The method of claim 1, further comprising:
  configuring the selected scope to comprise a hop count that represents a number of nodes in a multicast tree in which the request message propagates.

7. The method of claim 6, further comprising:
  decrementing the hop count at a node in the multicast tree receiving the request message; and
  forwarding the request message to a next node in the multicast tree.

8. The method of claim 1, wherein the sending the request message further comprises sending parameters for analysis by a node receiving the request message.

9. The method of claim 8, wherein the sending the parameters further comprises sending hop-by-hop parameters, the hop-by-hop parameters being modified by intermediate nodes during the propagation of the request message in the multicast tree.

10. The method of claim 8, wherein sending the parameters further comprises sending destination parameters, the destination parameters being used by a resource being discovered using the request message to determine whether the resource responds using a confirm or a reject message.

11. The method of claim 1, further comprising:
  receiving the request message at a node in a multicast tree;
  decrementing a hop count included in the scope;
  modifying hop-by-hop parameters;
  determining whether the hop count is equal to zero;
  passing the request message down the multicast tree when the hop count is not equal to zero;
  examining destination parameters in the request message; and
  unicasting a response message in response to the request message.

12. The method of claim 11, wherein the unicasting the response message comprises unicasting a decision field that indicates whether the response is a confirm message or a reject message, unicasting a returned hop count representing a value of the hop count field at the time the request message was received by the node, and unicasting a returned hop-by-hop parameter field representing a value of hop-by-hop parameters received by the node in the request message after modification by the node.

13. A method, comprising:

sending a first request message having a first selected scope to a known multicast group;

setting a timer responsive to the first request message being sent;

detecting whether a confirm message is received from an endpoint before the timer expires;

terminating endpoint locating when a confirm message is received from an endpoint prior to the expiration of the timer;

determining whether a scope increase is allowed when a confirm message is not received from an endpoint before the expiration of the timer;

terminating endpoint locating when a scope increase is not allowed;

increasing the scope to the second selected scope when a scope increase is allowed;

resetting the timer; and sending a second request message having the second selected scope when a confirm message is not received from an endpoint in response to the first request message, the second selected scope being greater than the first selected scope, wherein the method is configured to locate a suitable endpoint for setting up a connection.

14. The method of claim 13, wherein the determining further comprises inspecting fields of a response message and determining whether a scope increase is allowed based upon the response message and policies included therein.

15. The method of claim 13, wherein the having the selected scope comprises having a hop count representing a number of nodes in a multicast tree in which the request message propagates.

16. The method of claim 15, further comprising:

decrementing the hop count at a node in the multicast tree receiving the request message; and forwarding the request message to a next node in the multicast tree.

17. The method of claim 13, wherein the sending the request message comprises sending parameters for analysis by a node receiving the request message.

18. The method of claim 17, wherein the sending the parameters further comprises sending hop-by-hop parameters, the hop-by-hop parameters being modified by intermediate nodes during the propagation of the request message in the multicast tree.

19. The method of claim 17, wherein the sending the parameters further comprises sending destination parameters, the destination parameters being used by a resource being discovered using the request message to determine whether the resource responds using a confirm or a reject message.

20. The method of claim 13, further comprising:

receiving the request message at a node in a multicast tree;

decrementing a hop count included in the scope;

modifying hop-by-hop parameters;

determining whether the hop count is equal to zero;

passing the request message down the multicast tree when the hop count is not equal to zero;

examining destination parameters in the request message; and unicasting a response message in response to the request message.

21. The method of claim 20, wherein the unicasting the response message comprises unicasting a decision field that indicates whether the response is a confirm message or a reject message, unicasting a returned hop count representing a value of the hop count field at the time the request message was received by the node; and unicasting a returned hop-by-hop parameter field representing a value of hop-by-hop parameters received by the node in the request message after modification by the node.

22. An article of manufacture comprising a computer readable medium having instructions for causing a processor to locate a resource for establishing a connection thereto according to a method, the method comprising:

sending a first request message having a first selected scope;

analyzing whether a confirm message is received from a discovered resource within the first selected scope in response to the first request message; and sending a second request message having a second selected scope when a confirm message is not received from a discovered resource in response to the first request message, the second selected scope being greater than the first selected scope, wherein the article of manufacture is configured to provide resource discovery using multicast scope selection.

23. The article of manufacture of claim 22, wherein the analyzing further comprises setting a timer in response to the first request message being sent, detecting whether a confirm message is received before the timer expires, and terminating the resource discovery procedure when a confirm message is received prior to the expiration of the timer.

24. The article of manufacture of claim 23, wherein the detecting further comprises determining whether a scope increase is allowed when a confirm message is not received before the expiration of the timer, terminating the resource discovery procedure when a scope increase is not allowed, increasing the scope to the second selected scope when a scope increase is allowed, and resetting the timer.

25. The article of manufacture of claim 24, wherein the determining further comprises inspecting fields of a response message and determining whether a scope increase is allowed based upon the response message and policies included therein.

26. The article of manufacture of claim 22, wherein the sending further comprises transmitting the request message to a known multicast group.

27. The article of manufacture of claim 22, wherein the selected scope comprises a hop count, the hop count representing a number of nodes in a multicast tree in which the request message propagates.

28. The article of manufacture of claim 27, wherein the method further comprises decrementing the hop count at a node in the multicast tree receiving the request message and forwarding the request message to a next node in the multicast tree.

29. The article of manufacture of claim 22, wherein the request message further comprises parameters for analysis by a node receiving the request message.

30. The article of manufacture of claim 29, wherein the parameters further comprise hop-by-hop parameters, the hop-by-hop parameters being modified by intermediate nodes during the propagation of the request message in the multicast tree.

31. The article of manufacture of claim 29, wherein the parameters further comprise destination parameters, the destination parameters being used by a resource being discovered using the request message to determine whether the resource responds using a confirm or a reject message.

32. The article of manufacture of claim 22, wherein the method further comprises:
    receiving the request message at a node in a multicast tree;
    decrementing a hop count included in the scope;
    modifying hop-by-hop parameters;
    determining whether the hop count is equal to zero;
    passing the request message down the multicast tree when the hop count is not equal to zero;
    examining destination parameters in the request message; and
    unicasting a response message in response to the request message.

33. The article of manufacture of claim 32, wherein the response message comprises
    a decision field that indicates whether the response is a confirm message or a reject message,
    a returned hop count representing a value of the hop count field at the time the request message was received by the node, and
    a returned hop-by-hop parameter field representing a value of hop-by-hop parameters received by the node in the request message after modification by the node.

34. A discoverer, comprising:
    a discovery unit; and
    an application, operatively coupled to the discovery unit, the application configured to send a notification to the discovery unit to locate an endpoint application;
    wherein the discovery unit is configured to send a first request message having a first selected scope to a multicast group, analyze whether a desired confirm message is received from an endpoint application in response to the first request message, and send a second request message having a second selected scope when a desired confirm message is not received from the endpoint application in response to the first request message, wherein the second selected scope is greater than the first selected scope.

35. The discoverer of claim 34, further comprising:
    a timer configured to set a window in which to receive the desired confirm message, wherein the discovery unit is configured to set the timer in response to the first request message being sent, to detect whether a confirm message is received before the timer expires, and to terminate the location of an endpoint when a confirm message is received prior to the expiration of the timer.

36. The discoverer of claim 35, wherein the discovery unit is configured to determine whether a scope increase is allowed when a desired confirm message is not received before the expiration of the timer, to terminate the location of an endpoint when a scope increase is not allowed, and to increase the scope to the second selected scope and reset the timer when a scope increase is allowed.

37. The discoverer of claim 36, wherein the discovery unit is configured to determine whether a scope increase is allowed when a confirm message is not received before the expiration of the timer based upon the received response message and policies included therein.

38. The discoverer of claim 34, wherein the selected scope comprises a hop count, and the hop count represents a number of nodes in a multicast tree in which the request message propagates.

39. The discoverer of claim 34, wherein the request message further comprises parameters for analysis by a node receiving the request message.

40. The discoverer of claim 39, wherein the parameters further comprise hop-by-hop parameters, the hop-by-hop parameters being modified by intermediate nodes during the propagation of the request message in the multicast tree.

41. The discoverer of claim 39, wherein the parameters further comprise destination parameters, the destination parameters being used by an endpoint to determine whether the resource responds using a confirm or a reject message.

42. The discoverer of claim 34, wherein the application and the discovery unit are co-located.

43. The discoverer of claim 34, wherein the application and the discovery unit are not co-located.

44. The discoverer of claim 43, wherein the discovery unit comprises at least one of a base transceiver station, a base station controller, or a mobile services switching center.

45. The discoverer of claim 43, wherein the application comprises a mobile terminal.

46. A discoverer, comprising:
    a discovery means for providing resource discovery; and
    a notification means operatively coupled to the discovery means, for sending a notification to the discovery means to locate an endpoint application;
    wherein the discovery means comprises
    means for sending a first request message having a first selected scope to a multicast group,
    means for analyzing whether a desired confirm message is received from an endpoint application in response to the first request message, and
    means for sending a second request message having a second selected scope when a desired confirm message is not received from the endpoint application in response to the first request message,
    wherein the second selected scope is greater than the first selected scope.

47. The discoverer of claim 46, further comprising:
    a timer for setting a window in which to receive the desired confirm message,
    wherein the discovery means further comprises
    means for setting the timer in response to the first request message being sent,
    means for detecting whether a confirm message is received before the timer expires, and
    means for terminating the location of an endpoint when a confirm message is received prior to the expiration of the timer.

48. The discoverer of claim 47, wherein the discovery means further comprises
    means for determining whether a scope increase is allowed when a desired confirm message is not received before the expiration of the timer,
    means for terminating the location of an endpoint when a scope increase is not allowed, means for increasing the scope to the second selected scope when a scope increase is allowed, and means for resetting the timer.

49. The discoverer of claim 48, wherein the discovery means further comprises means for determining whether a scope increase is allowed when a confirm message is not received before the expiration of the timer based upon the received response message and policies included therein.

50. The discoverer of claim 46 wherein the selected scope comprises a hop count, and the hop count represents a number of nodes in a multicast tree in which the request message propagates.

51. The discoverer of claim 46, wherein the request message further comprises parameters for analysis by a node receiving the request message.

52. The discoverer of claim 51, wherein the parameters further comprise hop-by-hop parameters, the hop-by-hop parameters being modified by intermediate nodes during the propagation of the request message in the multicast tree.

53. The discoverer of claim 51, wherein the parameters further comprise destination parameters, the destination parameters being used by an endpoint to determine whether the resource responds using a confirm or a reject message.

54. The discoverer of claim 46, wherein the notification means and the discovery means are co-located.

55. The discoverer of claim 46, wherein the notification means and the discovery means are not co-located.

56. The discoverer of claim 55, wherein the discovery means comprises at least one of a base transceiver station, a base station controller, or a mobile services switching center.

57. The discoverer of claim 55, wherein the notification means comprises a mobile terminal.

58. A computer program product encoding a computer program of instructions stored in a computer readable medium for causing a processor to locate a resource for establishing a connection thereto according to a method, the method comprising:

sending a first request message having a first selected scope;

analyzing whether a confirm message is received from a discovered resource within the first selected scope in response to the first request message; and sending a second request message having a second selected scope when a confirm message is not received from a discovered resource in response to the first request message, the second selected scope being greater than the first selected scope.

59. The computer program product of claim 58, wherein the analyzing further comprises setting a timer in response to the first request message being sent, detecting whether a confirm message is received before the timer expires, and terminating the resource discovery procedure when a confirm message is received prior to the expiration of the timer.

60. The computer program product of claim 59, wherein the detecting further comprises determining whether a scope increase is allowed when a confirm message is not received before the expiration of the timer, terminating the resource discovery procedure when a scope increase is not allowed, increasing the scope to the second selected scope when a scope increase is allowed, and resetting the timer.

61. The computer program product of claim 60, wherein the determining further comprises inspecting fields of a response message and determining whether a scope increase is allowed based upon the response message and policies included therein.

62. The computer program product of claim 58, wherein the sending further comprises transmitting the request message to a known multicast group.

63. The computer program product of claim 58, wherein the selected scope comprises a hop count, the hop count representing a number of nodes in a multicast tree in which the request message propagates.

64. The computer program product of claim 63, wherein the method further comprises decrementing the hop count at a node in the multicast tree receiving the request message and forwarding the request message to a next node in the multicast tree.

65. The computer program product of claim 58, wherein the request message further comprises parameters for analysis by a node receiving the request message.

66. The computer program product of claim 65, wherein the parameters further comprise hop-by-hop parameters, the hop-by-hop parameters being modified by intermediate nodes during the propagation of the request message in the multicast tree.

67. The computer program product of claim 65, wherein the parameters further comprise destination parameters, the destination parameters being used by a resource being discovered using the request message to determine whether the resource responds using a confirm or a reject message.

68. The computer program product of claim 58 wherein the method further comprises receiving the request message at a node in a multicast tree, decrementing a hop count included in the scope, modifying hop-by-hop parameters, determining whether the hop count is equal to zero, passing the request message down the multicast tree when the hop count is not equal to zero, examining destination parameters in the request message, and unicasting a response message in response to the request message.

69. The computer program product of claim 68, wherein the response message comprises a decision field that indicates whether the response is a confirm message or a reject message, a returned hop count representing a value of the hop count field at the time the request message was received by the node, and a returned hop-by-hop parameter field representing a value of hop-by-hop parameters received by the node in the request message after modification by the node.

* * * * *